US010121145B2

United States Patent
Abrams et al.

(10) Patent No.: US 10,121,145 B2
(45) Date of Patent: Nov. 6, 2018

(54) ELECTRONIC REGISTRATION FOR SECURELY PROVIDING PRODUCTS AND SERVICES

(71) Applicant: Diesel Direct, Inc., Stoughton, MA (US)

(72) Inventors: Daniel B. Abrams, Stoughton, MA (US); Paul A. Sullivan, South Attleboro, MA (US)

(73) Assignee: Diesel Direct, Inc., Stoughton, MA (US)

( * ) Notice: Subject to any disclaimer, the term of this patent is extended or adjusted under 35 U.S.C. 154(b) by 1247 days.

(21) Appl. No.: 13/796,832

(22) Filed: Mar. 12, 2013

(65) Prior Publication Data
US 2014/0019359 A1    Jan. 16, 2014

Related U.S. Application Data

(60) Provisional application No. 61/671,362, filed on Jul. 13, 2012.

(51) Int. Cl.
| | |
|---|---|
| *G06Q 40/00* | (2012.01) |
| *G06Q 20/40* | (2012.01) |
| *G07F 13/02* | (2006.01) |
| *G06Q 30/06* | (2012.01) |

(52) U.S. Cl.
CPC ............ *G06Q 20/40* (2013.01); *G06Q 30/06* (2013.01); *G07F 13/025* (2013.01)

(58) Field of Classification Search
CPC ........ G06Q 10/00; G06Q 40/00; G06Q 40/02; G06Q 40/04

USPC .......................................................... 705/35
See application file for complete search history.

(56) References Cited

U.S. PATENT DOCUMENTS

| | | | | |
|---|---|---|---|---|
| 5,289,369 A | * | 2/1994 | Hirshberg | G06Q 10/02 235/382.5 |
| 5,831,861 A | * | 11/1998 | Warn | B67D 7/04 222/52 |
| 6,954,758 B1 | * | 10/2005 | O'Flaherty | G06Q 30/02 707/802 |

(Continued)

FOREIGN PATENT DOCUMENTS

| | | |
|---|---|---|
| JP | 06-251208 A | 9/1994 |
| WO | WO 00-50985 A1 | 8/2000 |

OTHER PUBLICATIONS

International Search Report and Written Opinion for International Application No. PCT/US2013/049904 dated Nov. 27, 2013.

*Primary Examiner* — Kristen S Apple
(74) *Attorney, Agent, or Firm* — Wolf, Greenfield & Sacks, P.C.

(57) ABSTRACT

Some embodiments are directed to a method of providing a product and/or a service, at least one non-transitory computer-readable storage medium comprising computer-executable instructions that, when executed by at least one processor, perform a method of providing a product and/or a service, and an apparatus for providing a product and/or service. An identifier of an asset is read and the asset is identified based on the identifier. A transaction is authorized based on the identified asset. The produce and/or service is acquired and a data associated with the transaction is recorded in at least one storage device. The recorded data is then transmitted to a server.

13 Claims, 3 Drawing Sheets

(56) References Cited

U.S. PATENT DOCUMENTS

| | | | | |
|---|---|---|---|---|
| 7,114,656 B1* | 10/2006 | Garver | .................... | A47F 9/048 |
| | | | | 235/462.46 |
| 8,108,231 B2* | 1/2012 | Boruff | .................... | G06Q 10/02 |
| | | | | 705/26.41 |
| 8,234,134 B2* | 7/2012 | Fitzgerald | .......... | G06Q 30/0645 |
| | | | | 705/307 |
| 8,271,309 B2* | 9/2012 | Stephens | ............ | G06Q 30/0645 |
| | | | | 705/27.1 |
| 2005/0125336 A1* | 6/2005 | Rosenblatt | ............. | G06Q 20/10 |
| | | | | 705/39 |
| 2007/0094089 A1 | 4/2007 | Wilbrink et al. | | |
| 2009/0289113 A1 | 11/2009 | Vilnai et al. | | |
| 2010/0106623 A1* | 4/2010 | Menendez | ............ | G06F 17/243 |
| | | | | 705/26.1 |
| 2011/0264581 A1* | 10/2011 | Clyne | .................... | G06Q 20/10 |
| | | | | 705/39 |
| 2011/0313822 A1 | 12/2011 | Burdick | | |
| 2013/0073386 A1* | 3/2013 | Rose | ...................... | G06Q 40/02 |
| | | | | 705/14.53 |

* cited by examiner

ELECTRONIC REGISTRATION FOR SECURELY PROVIDING PRODUCTS AND SERVICES

RELATED APPLICATION

This application claims priority under 35 U.S.C. § 119(e) to U.S. Provisional Application No. 61/671,362 filed Jul. 13, 2012 under and entitled "ELECTRONIC REGISTRATION FOR SECURELY PROVIDING PRODUCTS AND SERVICES," the entire contents of which is incorporated herein by reference.

BACKGROUND

Organizations may use a fleet of vehicles for transporting and distributing goods. When a vehicle of the fleet requires a service or product, the service or product may be received based on an authorization or information/credentials provided by the driver of the vehicle. For example, drivers of the vehicles may be provided with a credit/fuel cards, key passes or codes used to purchase products and services their vehicles. Fuel may be acquired, for example, from an unmanned fuel island that allows fuel to be dispensed to vehicles by the driver of the vehicle. The fuel purchases are charged back to the organization's account via the credit/fuel card, key pass or code used to make the purchase.

SUMMARY

Some embodiments are directed to a method of providing a product and/or a service. The method may include reading an identifier of an asset; identifying, with at least one processor, the asset based on the identifier; authorizing, with at least one processor, a transaction based on the identified asset; acquiring the product and/or service; recording data associated with the transaction in at least one storage device; and transmitting, via at least one network, the recorded data to a server. In some embodiments, access to the product and/or service may be denied based on a result of the authorizing act. Some embodiments may monitor one or more conditions; determine whether a particular condition is met; and in response to determining that the particular condition is met, deny access to the product and/or service.

In some embodiments, the identifier may be a bar code, a QR code or an RFID. The act of reading the identifier may be performed by a handheld scanner. The asset may be, for example, a truck, a bus, a car, a boat, an airplane or a helicopter.

In some embodiments, the method of providing a product and/or a service may further include identifying an account based on the at least one identifier; and automatically billing the account for the transaction.

Some embodiments are directed to at least one non-transitory computer-readable storage medium comprising computer-executable instructions that, when executed by at least one processor, perform the above method.

Some embodiments are directed to an apparatus for providing a product and/or a service. The apparatus may include a scanner for reading an identifier associated with an asset; a controller for authorizing a transaction based on the identifier; at least one measurement device for measuring transaction information; and a network interface for communication with at least one network and sending transaction information to an external server. The controller may be further configured to monitor one or more conditions; determine whether a particular condition is met; and in response to determining that the particular condition is met, deny access to the product and/or service. In some embodiments, the controller may be further configured to identify an account based on the at least one identifier; and automatically bill the account for the transaction. In some embodiments the scanner may be a barcode reader, a digital camera or an RFID reader. The asset may be a vehicle such as a truck, a bus, a car, a boat, an airplane or a helicopter. In some embodiments, the vehicle may be one member of a fleet of vehicles owned by the same entity. The apparatus may be a fueling station operated by the entity that owns the fleet of vehicles.

DETAILED DESCRIPTION

Figure 1:
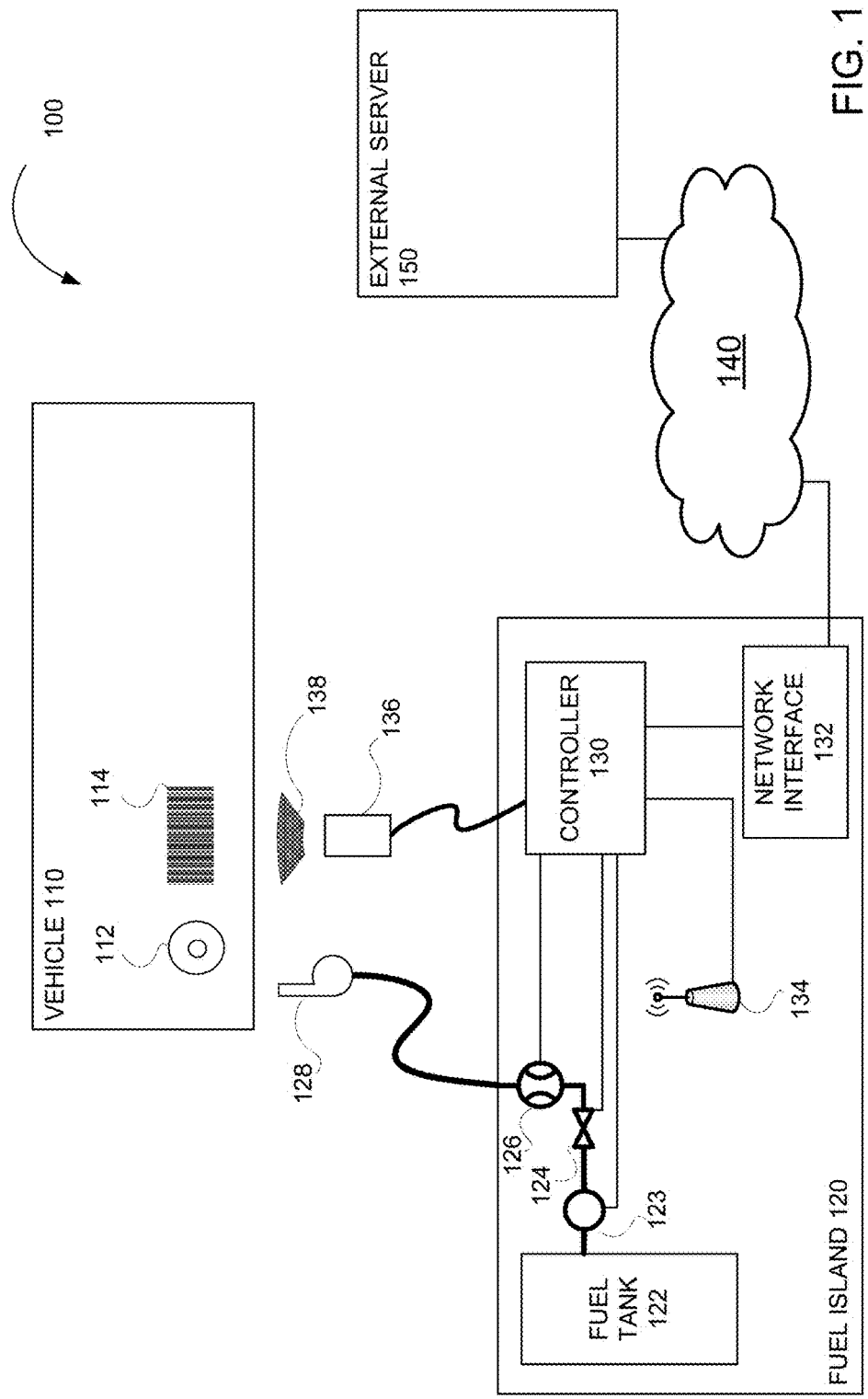
FIG. 1 illustrates an exemplary embodiment of a fuel dispensing system in which a vehicle is authorized to receive fuel from a fuel island based on an identifier attached the vehicle.

The inventors have recognized and appreciated that the use of transferable forms of identification, such as a credit card, allows drivers to use the organization's account for purchasing products or services, for example fuel, for a vehicle other than the organization's vehicle. This type of abuse is difficult to deter and may result in significant loss for the organization. The inventors have recognized and appreciated that operation of a fleet of vehicles may be improved by providing a secure method of providing products and services to assets belonging to an organization. By authorizing transactions based on an identifier affixed to each asset, vendors may provide their products and services to the assets while reducing the risk that the purchase is provided to a different, unauthorized asset. In addition to preventing potential fraud, a further advantage of affixing identification means to each asset is easier, accurate, real-time reporting of products and services received by each asset. Moreover, the distribution of the product or service may be based on authentication using the identifier and may be independent of any other form of authentication associated with the driver of the vehicle. For example, even if the driver of the truck has a valid credit card, access to a product or service may be denied if the vehicle lacks an identifier that authorizes the vehicle to receive that product or service.

The present application describes exemplary embodiments where the asset is a vehicle and the product being provided is fuel. However, embodiments of the invention are not so limited. Any suitable asset may be used. Furthermore, embodiments are not limited to providing products. Services, such as maintenance of the assets, may be provided in some embodiments. For example, a service may include engine maintenance on vehicles, such as oil changes.

Some embodiments use an electronic registering system to identify and verify vehicles for which a product is being provided. A vehicle may be outfitted with an identifier that enables the vendor of the product to determine whether the vehicle is authorized to receive the product. Any suitable identifier may be used. For example, the identifier may be a barcode. Any type of barcode may be used, such as a one-dimensional barcode or a 2-dimensional barcode, such as a Quick Response (QR) code. Alternatively, a radio frequency identifier (RFID) or other near field communication (NFC) may be used as an identifier.

The identifier may be located anywhere on the vehicle. Placement of the identifier may be determined based on the type of product or service being provided. In some embodiments, it may be located near the vehicle's fuel tank. This placement is useful when the product being provided is fuel. Alternatively, the identifier may be located near the hood of the vehicle. This placement may be beneficial when the service being provided is engine maintenance.

The identifier identifies the vehicle to which it is attached and may be completely independent from the driver of the vehicle. In some embodiments, the barcode may additionally identify an account set up with the vendor of the product to pay for the product provided to the vehicle. In some embodiments the account may be associated with a credit account via, for example a credit card, that is billed for the purchase. However, embodiments of the invention are not limited to any specific payment method. For example, the vendor may send the owner of the vehicle paper invoices. Alternatively, electronic invoices may be used. For example, invoices may be sent to the owner of the vehicle by email or uploaded to a predefined server associated with the owner of the vehicle. In some embodiments an electronic data interchange (EDI) interface with the owner of the vehicle or a third party clearing house may be used to send invoices. By issuing invoices to the owner of the vehicle via the established account with the vendor of the product or service, the need to provide the driver of the vehicle with credentials for authorizing the transaction is eliminated. The vehicle may be labeled with the identifier to provide the credentials and the owner of the vehicle may receive a bill for each individual vehicle or a single bill for the entire fleet of vehicles, though it is not a requirement that the identifier be used in a system in which the provider of the product or service bills an owner of the vehicle for the product or service. In some embodiments, a system as described herein may be used when the owner of the vehicle operates the facility that provides the product or service. For example, a system as described herein may be used at an authorized fuel island operated by an owner of a fleet of vehicles.

FIG. 1 illustrates an embodiment 100 of the application where a vehicle 110 is authorized to receive fuel from a fuel island based on an identifier 114 attached the vehicle 110. Vehicle 110 may be owned by a corporation, organization or individual. The owner of the vehicle 110 may have an account with the vendor that operates fuel island 120. The vehicle 110 may have an identifier 114 affixed to the vehicle. As mentioned above, the identifier may be any suitable identifier, such as an RFID or a barcode. In FIG. 1, the identifier is illustrated as a one-dimensional barcode. The identifier 114 may be affixed at any suitable location. FIG. 1 illustrates an embodiment where fuel is provided to the vehicle. In this example, the identifier 114 is affixed near a filler neck 112 of the vehicle's fuel tank (not shown in FIG. 1).

Any suitable vehicle 110 may be used. For example, the vehicle 110 may be a road vehicle such as a truck, bus, car or motorcycle. Alternatively, the vehicle 110 may be a water vehicle such as a boat or a ship or an aerial vehicle such as a helicopter or an airplane.

In this example, fuel island 120 is operated by a fuel vendor. The vendor may provide the product to the public or may only provide the fuel to pre-established customers that have accounts with the vendor. In some embodiments, the fuel island 120 may be operated by the same entity that owns the vehicle 110. For example, a shipping company may establish fuel stations to provide fuel only to its own fleet of vehicles. FIG. 1 illustrates the fuel island 120 as a stationary apparatus that is always at a single location. Stationary fuel islands 120 may be unattended by a representative of the vendor. The driver of vehicle 110 may then be responsible for performing the actual re-fueling using the fuel island 120 provided by the vendor.

FIG. 1 illustrates a fuel island 120 comprising a fuel tank 122, a fuel pump 123, a shut-off valve 124, a flow meter 126, a fuel nozzle 128, a controller 130, a network interface 132, a wireless communication antenna 134, and a scanner 136 that may emit radiation 138. It should be appreciated that embodiments are not limited to include each of these components, and some embodiments may comprise additional components. For example, a fuel island 120 may include a plurality of nozzles 128, each with its own flow meter 126, valve 124 and fuel pump 123, allowing multiple drivers to re-fuel simultaneously. Alternatively, one or more of the components may not be included in some embodiments. For example, wireless communication antenna 134 and network interface 132 may not both be present in some embodiments.

The driver of vehicle 110, or a representative of the vendor, may use scanner 136 to read the identifier 114 of vehicle 110. The scanner 136 may be a handheld scanner that emits radiation 138. If the scanner is handheld, it may communicate to the controller 130 via a communication cable. To prevent the cable from being forcibly broken or detached, the scanner may be attached to the fuel island using any suitable attachments means, such as a chain, cable or rope. Alternatively, scanner 136 may be mounted directly to the fuel island 120. In some embodiments, the scanner 136 may be attached to the fuel nozzle 128, a handle or other moveable portion of fuel island 120 that is positioned near a vehicle for refueling. Any suitable type of scanner may be used. For example, if the identifier 114 is a one-dimensional barcode, then the scanner may emit radiation 138, such as laser light, to scan the barcode and acquire identification information from the identifier. If the identifier 114 is a 2-dimensional barcode, then the scanner may be a camera, such as a digital still camera or a digital video camera that emits no radiation. If the identifier 114 is a RFID, then the scanner may be a RFID reader that emits radio frequency radiation.

Identification information acquired by scanner 136 may be transmitted to controller 130. Controller 130 may be any suitable computing environment and will be discussed in more detail below. Based on the acquired identification information, the controller 130 may authorize refueling. This may be done in any suitable way. For example, controller 130 may have locally stored information identifying valid customers who are authorized to acquire fuel from fuel island 120. Alternatively, the controller 130 may send a request via network interface 132 to a computer (not shown in FIG. 2) for authorization. The request may be sent over any suitable network 140, such as the internet.

Authorization may be performed in any suitable way. For example, the identification information acquired from the identifier 114 of the vehicle 110 may be compared to a record of authorized vehicles. If the identification information corresponds to an authorized vehicle, then the vehicle is authorized to receive fuel. However, authorization may be based on additional criteria. For example, a vehicle may not be authorized if the vehicle is not associated with a valid account. Any suitable criteria may be used to determine whether an account is valid. These criteria may be checked automatically by controller 130 based on a comparison to data stored locally at the fuel island 120 or via communication with a remote device, such as external server 150. An account may be considered invalid if, for example, the account is overdue or the account was previously canceled.

In some embodiments, a record of authorized vehicles may be received by the fuel island 120 from an external server. The record may be received via a wireless communication antenna 134 or a network interface 132 using a wired communication medium. The record of authorized vehicles may include information about each of the vehicles, including identification information, owner information, fuel tank capacity of the vehicle, and account that should be billed for products and services received by the vehicle. Caching this information at the fuel island 120 allows authorization determinations to be made locally by the controller 130. The record of authorized vehicles may be updated periodically or only when the record is changed at an external server. A download of the record of authorized vehicles may be initiated by the controller 130 of the fuel island 120 or by an external server.

In response to authorizing the vehicle, the controller 130 may allow the fuel to be dispensed from nozzle 128 to the vehicle 110. This may be done in any suitable way. For example, controller 130 may turn the fuel pump 123 on, allowing the fuel pump 123 to pump fuel from fuel tank 122. Any suitable pump may be used. In some embodiments, there may be a shut-off valve 124 that may be controlled by the controller 130. If the valve 124 is closed, no fuel will be delivered to nozzle 128, thereby preventing the vehicle 110 from receiving fuel. Any suitable valve may be used.

In some embodiments, a flow meter 126 may be used to measure how much fuel is delivered to vehicle 110. Any suitable flow meter may be used. In some embodiments, the number of pulses made by the fuel pump may be monitored to determine the amount of fuel being dispensed. In this case, a separate flow meter may not be necessary. The measurement information from the flow meter 126 may be provided to controller 130. The amount of fuel dispensed to vehicle 110 may be stored locally at the fuel island 120 and then sent via wireless communication antenna 134 or network interface 132 to an external server 150. For example, in the case communication is down, transaction information may be buffered locally until communication is reinstated and the information may be transferred to the server. Alternatively, transaction information from multiple vehicles associated with the same owner may be stored locally and sent as a batch to the external server. This may be done, for example, one per day. In some embodiments, the external server 150 may be associated with the owner of vehicle 110. In this manner, the owner of a fleet of vehicles may receive real-time information about how much fuel is being dispensed to a particular vehicle. Other information, such as time, date and location information may also be sent from controller 130 to the external server 150. Accordingly, the owner of a fleet of vehicles may track how often vehicles are refueling, how much fuel each vehicle is using and the locations where refueling is occurring.

In some embodiments, the external server 150 may be operated by the vendor. The vendor may provide the owner of the vehicle access to data stored on the server. For example, the owner of the vehicle may be sent usage bills and/or given a login to the server, thereby allowing the vehicle owner to view and manipulate the data. Alternatively, the external server 150 may be operated by a third party. The data may be stored locally and/or at external server 150 in any suitable way. For example, data may be stored in a database, a table or any suitable text file Any suitable technique may be used to ensure that scanned identifier is associated with the vehicle being refueled. In some embodiments, the system may implement additional checks, either at the controller 130 or at an external server, to reduce the chance of fraud, such as the refilling of a vehicle other than the vehicle 110 to which the identifier 114 is attached. A variety of conditions may be monitored and if any one of the conditions is met, access to the fuel may be denied.

In some embodiments, controller 130 may monitor the amount of time between the reading of the identifier 114 and the time when refueling begins. If the amount of time exceeds a threshold, then controller 130 may prevent the fuel island 120 from dispensing fuel by, for example, turning off the pump 123 or closing valve 124. In some embodiments, the driver of vehicle 110 may have to read the identifier again to restart the process of refueling. By implementing this time limit, the ability for an unauthorized vehicle to receive fuel fraudulently may be hindered.

Controller 130 may also monitor the flow of the fuel to detect if the flow of fuel is stopped. If the flow stops for an amount of time that exceeds a threshold amount of time, the fuel island 120 may prevent additional fuel from being dispensed. This time limit associated with the flow of fuel being stopped may prevent an authorized vehicle from receiving fuel after the authorized vehicle's identification information has been read.

A condition based on the amount of fuel received by a particular vehicle may also be used. For example, if vehicle 110 has a fuel tank of a certain size, the fuel island may determine, using flow meter 126, that a maximum amount of fuel has been dispensed to vehicle 110. The size of a vehicle's fuel tank may be obtained, for example, from an external server that sends vehicle information to controller 130. If a threshold amount of fuel is exceeded, the controller 130 may shut off pump 123 or close valve 124 or otherwise prevent additional fuel from being provided. In this way, fuel island 120 may prevent a driver from using the fuel for purposes other than refueling the vehicle 110, such as filling another, unauthorized vehicle or other fuel containers.

In some embodiments, where the scanner 136 is a digital camera, a condition may be based on the presence of vehicle 110. For example, if the camera is mounted to the fuel island 120, the identifier 114 may be monitored by the scanner 136 throughout the refueling transaction. If the identifier is no longer visible to scanner 136, for example, due to the vehicle 110 moving to allow access to the fuel island by an unauthorized vehicle, then the controller 130 may shut off pump 123 or close valve 124 or otherwise prevent additional fuel from being provided.

Any suitable condition may be used to stop the flow of fuel from the fuel island 120. More than one condition may be monitored simultaneously. Furthermore, conditions may be checked at any time. For example, conditions may be checked after reading identifier 114 but before refueling has begun. Conditions may also be monitored throughout the refueling process. Accordingly, access to the fuel may be denied at any point during the refueling process.

Figure 2:
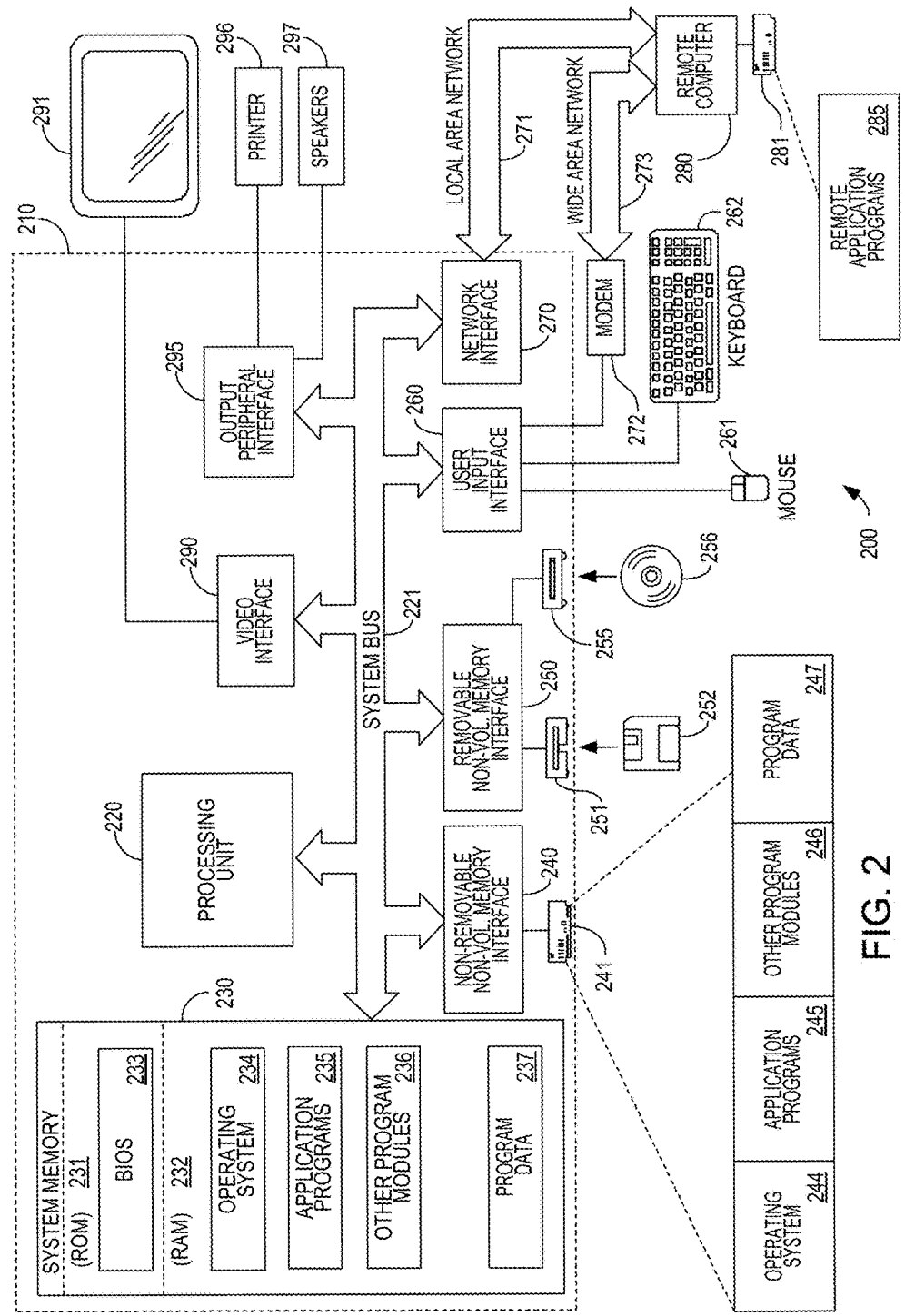
FIG. 2 illustrates an exemplary computing environment that may be used in embodiments of the present application.

Controller 130 and external server 150 may be implemented in any suitable way. For example, controller 130 may be a single chip computer. However, in some embodiments it may be a multi-component computer. FIG. 2 illustrates an exemplary computing environment 200 that may be used in embodiments of the present application as the controller 130 or the external server 150. The computing system environment 200 is only one example of a suitable computing environment and is not intended to suggest any limitation as to the scope of use or functionality of the invention. Neither should the computing environment 200 be interpreted as having any dependency or requirement relating to any one or combination of components illustrated in the exemplary operating environment 200.

Embodiments are operational with numerous other general purpose or special purpose computing system environments or configurations. Examples of well-known computing systems, environments, and/or configurations that may be suitable for use with some embodiments include, but are not limited to, personal computers, server computers, multiprocessor systems, microprocessor-based systems, minicomputers, distributed computing environments that include any of the above systems or devices, and the like.

The computing environment may execute computer-executable instructions, such as program modules. Generally, program modules include routines, programs, objects, components, data structures, etc. that perform particular tasks or implement particular abstract data types. Embodiments may also be practiced in distributed computing environments where tasks are performed by remote processing devices that are linked through a communications network. In a distributed computing environment, program modules may be located in both local and remote computer storage media including memory storage devices.

With reference to FIG. 2, an exemplary system for implementing the invention includes a general purpose computing device in the form of a computer 210. Components of computer 210 may include, but are not limited to, a processing unit 220, a system memory 230, and a system bus 221 that couples various system components including the system memory to the processing unit 220. The system bus 221 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 210 typically includes a variety of computer readable media. Computer readable media can be any available media that can be accessed by computer 210 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 210. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 230 includes computer storage media in the form of volatile and/or nonvolatile memory such as read only memory (ROM) 231 and random access memory (RAM) 232. A basic input/output system 233 (BIOS), containing the basic routines that help to transfer information between elements within computer 210, such as during start-up, is typically stored in ROM 231. RAM 232 typically contains data and/or program modules that are immediately accessible to and/or presently being operated on by processing unit 220. By way of example, and not limitation, FIG. 2 illustrates operating system 234, application programs 235, other program modules 236, and program data 237.

The computer 210 may also include other removable/non-removable, volatile/nonvolatile computer storage media. By way of example only, FIG. 2 illustrates a hard disk drive 241 that reads from or writes to non-removable, nonvolatile magnetic media, a magnetic disk drive 251 that reads from or writes to a removable, nonvolatile magnetic disk 252, and an optical disk drive 255 that reads from or writes to a removable, nonvolatile optical disk 256 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 241 is typically connected to the system bus 221 through a non-removable memory interface such as interface 240, and magnetic disk drive 251 and optical disk drive 255 are typically connected to the system bus 221 by a removable memory interface, such as interface 250.

The drives and their associated computer storage media discussed above and illustrated in FIG. 2, provide storage of computer readable instructions, data structures, program modules and other data for the computer 210. In FIG. 2, for example, hard disk drive 241 is illustrated as storing operating system 244, application programs 245, other program modules 246, and program data 247. Note that these components can either be the same as or different from operating system 234, application programs 235, other program modules 236, and program data 237. Operating system 244, application programs 245, other program modules 246, and program data 247 are given different numbers here to illustrate that, at a minimum, they are different copies. A user may enter commands and information into the computer 210 through input devices such as a keyboard 262 and pointing device 261, commonly referred to as a mouse, trackball or touch pad. Other input devices (not shown) may include a microphone, joystick, game pad, satellite dish, scanner, or the like. These and other input devices are often connected to the processing unit 220 through a user input interface 260 that is coupled to the system bus, but may be connected by other interface and bus structures, such as a parallel port, game port or a universal serial bus (USB). A monitor 291 or other type of display device is also connected to the system bus 221 via an interface, such as a video interface 290. In addition to the monitor, computers may also include other peripheral output devices such as speakers 297 and printer 296, which may be connected through an output peripheral interface 295.

The computer 210 may operate in a networked environment using logical connections to one or more remote computers, such as a remote computer 280. The remote computer 280 may be a personal computer, a server, a router, a network PC, a peer device or other common network node, and typically includes many or all of the elements described above relative to the computer 210, although only a memory storage device 281 has been illustrated in FIG. 2. The logical connections depicted in FIG. 2 include a local area network (LAN) 271 and a wide area network (WAN) 273, but may also include other networks. Such networking environments are commonplace in offices, enterprise-wide computer networks, intranets and the Internet.

When used in a LAN networking environment, the computer 210 is connected to the LAN 271 through a network interface or adapter 270. When used in a WAN networking environment, the computer 210 typically includes a modem 272 or other means for establishing communications over the WAN 273, such as the Internet. The modem 272, which may be internal or external, may be connected to the system bus 221 via the user input interface 260, or other appropriate mechanism. In a networked environment, program modules depicted relative to the computer 210, or portions thereof, may be stored in the remote memory storage device. By way of example, and not limitation, FIG. 2 illustrates remote application programs 285 as residing on memory device 281. It will be appreciated that the network connections shown are exemplary and other means of establishing a communications link between the computers may be used.

Figure 3:
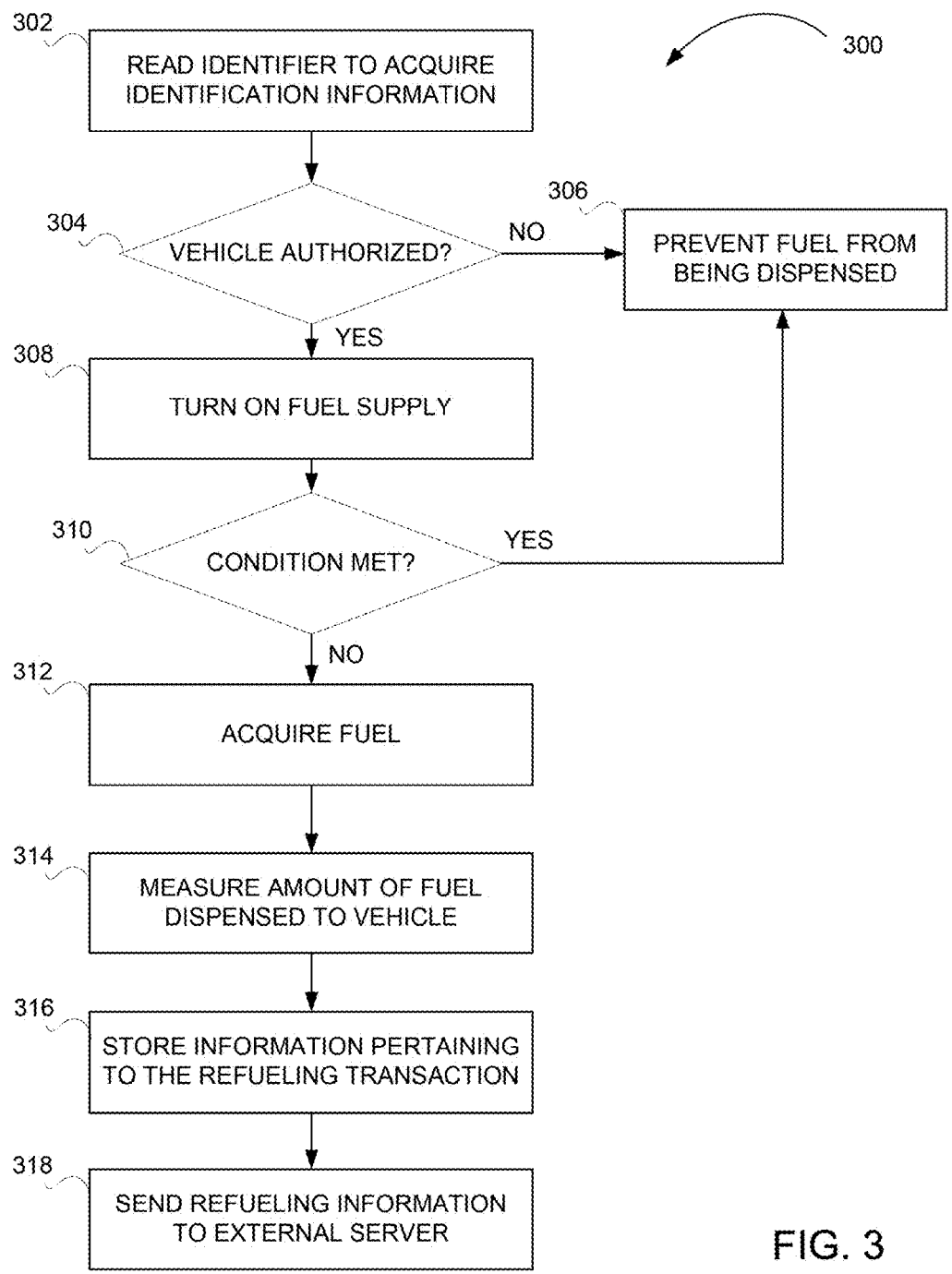
FIG. 3 illustrates a flowchart for a method of one embodiment of the present invention.

FIG. 3 illustrates a flowchart for a method 300 of one embodiment of the present invention. Method 300 is only one example of a suitable embodiment of the present application and is not intended to suggest any limitation as to the scope of use or functionality of the invention. Embodiments of the invention may comprise additional acts not shown in FIG. 3. Moreover, every act of method 300 may not be present in every embodiment of the present application. Acts of method 300 may be performed by a computing device local to the fuel island 120 and/or my an external server 150.

The method 300 begins at act 302 when the identifier 114 is scanned. As mentioned above, the identifier 114 may be scanned by any suitable scanner 136, such as a barcode reader or a digital camera. The scanner 136 may be operated by the driver of a vehicle to be refueled or a representative of the fuel vendor. In some embodiments, the reading may occur automatically with no need for a human operator. For example, the scanner may be a video camera that records the vehicle 110 as it pulls up to fuel island 120.

At act 304, it is determined whether the vehicle is authorized to receive fuel. This may be done, for example, by controller 130. The determination may be based on locally stored information pertaining to authorized vehicles. Alternatively, the controller 130 may contact an external computer to determine whether vehicle 110 is authorized. If it is determined that the vehicle 110 is not authorized to receive fuel, then fuel is prevented from being dispensed at act 306. In some embodiments act 306 may not require an affirmative change to components on fuel island 120 because, by default, fuel is prevented from being dispensed if the vehicle has not been authorized.

If it is determined at act 304 that the vehicle is authorized, then the fuel supply may be turned on at act 308. This may be done in any suitable way. For example, fuel pump 123 may be turned on or valve 124 may be opened. After turning on the fuel supply, various measurements may be made to determine whether a condition is met at act 310. Any suitable condition may be used. For example, the amount of time between turning on the fuel supply at act 308 and dispending the fuel at act 312 may be measured. If this time exceeds a threshold, then a condition is met.

If a condition is met at act 310, then method 300 continues to act 306 where the fuel is prevented from being dispensed. If the driver of the vehicle wishes to acquire fuel, the vehicle identifier must be rescanned at act 302.

At act 312, fuel is acquired by vehicle 110. During the refueling various measurements may be made and recorded. For example, the amount of fuel dispensed may be measured using flow meter 126 at act 314. FIG. 3 illustrates act 314 occurring after act 312, but they may occur simultaneously. The time of the refueling and the total amount of time spent refueling may also be measured.

At act 314, the information attained via the above measurements is stored. The information may be stored locally. In addition, or alternatively, the information may be sent to an external server at act 318.

FIG. 3 illustrates acts in a specific order. It should be appreciated that the timing and order of the acts is not limited. For example, act 310, determining whether a condition is met, may be performed at any point in method 300. In some embodiments it may be performed during act 312 while fuel is being acquired. For example, the amount of fuel being dispensed may be monitored. The condition may be met when a threshold amount of fuel is dispensed. This threshold may be a globally set threshold. Alternatively, thresholds may be set for each individual vehicle. The threshold may be set based on the size of a particular vehicle's fuel tank.

It may be determined whether a condition is met prior to turning on the fuel supply at act 308. For example, how many refueling attempts the vehicle 110 has had in a given time period may be monitored. If the number of refueling attempts exceeds a threshold number of attempts in a specified period of time, then the fuel supply may never be turned on in the first place. In some embodiments, the amount of dispensed fuel in a given period of time may be monitored and if a threshold is exceeded in a specified period of time, then the fuel supply may never be turned on. For example, if a vehicle 110 received a full tank of fuel and a short time period later attempts to acquire more fuel, the fuel island 120 may deny access to the fuel in an attempt to combat potential fraud. In some embodiments, whether a condition is met is determined by the controller 130. Alternatively, the determination may be made by an external server 150.

The various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. An apparatus for providing a product, the apparatus comprising:
   a scanner for reading an identifier affixed to a vehicle;
   a storage container for storing the product;
   at least one dispensing mechanism for the product;
   a controller comprising a memory configured to access a record of authorized vehicles, the controller configured to compare the identifier with the record of authorized vehicles and to, in response to a result of comparison between the identifier with the record of authorized vehicles being positive, automatically enable the at least one dispensing mechanism to supply the product from the storage container to the vehicle;
   at least one meter for measuring transaction information; and
   a network interface configured to communicate with at least one network to send the transaction information to an external server.

2. The apparatus of claim 1, wherein the controller:
   monitors one or more conditions;
   determines whether a particular condition is met; and
   in response to determining that the particular condition is met, denies access to the product.

3. The apparatus of claim 1, wherein the scanner is selected from the group consisting of a barcode reader, a digital camera and an RFID reader.

4. The apparatus of claim 1, wherein the vehicle is selected from the group consisting of a truck, a bus, a car, a boat, an airplane and a helicopter.

5. The apparatus of claim 4, wherein the vehicle is one member of a fleet of vehicles owned by a same entity.

6. The apparatus of claim 5, wherein:
   the apparatus is a fueling station operated by the entity that owns the fleet of vehicles.

7. The apparatus of claim 1, wherein the controller:
   identifies an account based on the at least one identifier; and
   automatically bills the account for the transaction.

8. The apparatus of claim 1, wherein:
   the dispensing mechanism comprises a fuel pump.

9. The apparatus of claim 1, wherein:
   the dispensing mechanism comprises a shut-off valve.

10. The apparatus of claim 1, wherein:
    the controller is configured to receive the record of authorized vehicles via the network interface.

11. The apparatus of claim 1, wherein:
    the product is fuel, and
    the memory is further configured to store a fuel tank capacity associated with each vehicle of the record of authorized vehicles, wherein
    the controller is configured to obtain a fuel tank capacity associated with the vehicle based on the identifier, and to selectively disable the at least one dispensing mechanism based on a comparison involving the fuel tank capacity and an indication from the at least one meter of an amount of fuel that has been dispensed.

12. The apparatus of claim 1, wherein:
    the controller is configured to monitor physical proximity of the vehicle to the apparatus and to selectively enable the at least one dispensing mechanism only when the vehicle is present.

13. The apparatus of claim 12, wherein:
    the controller is configured to automatically disable the at least one dispensing mechanism in response to an indication from the scanner that the identifier is no longer visible to the scanner.

* * * * *